US 6,712,088 B2

(12) United States Patent
Gamou et al.

(10) Patent No.: US 6,712,088 B2
(45) Date of Patent: Mar. 30, 2004

(54) PILOT-TYPE CHANNEL VALVES PROVIDING COUNTER-FLOW PREVENTION

(75) Inventors: Masaru Gamou, Obu (JP); Syoichi Hagiwara, Obu (JP); Takeshi Yamamoto, Aichi-ken (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 21 days.

(21) Appl. No.: 09/994,938

(22) Filed: Nov. 28, 2001

(65) Prior Publication Data

US 2002/0088955 A1 Jul. 11, 2002

(30) Foreign Application Priority Data

Dec. 1, 2000 (JP) ........................................ 2000-366985

(51) Int. Cl.[7] ................................................. F16K 49/00
(52) U.S. Cl. ................. 137/341; 137/614.2; 251/30.03; 251/34; 251/368
(58) Field of Search ........................... 251/30.01, 30.02, 251/30.03, 30.04, 30.05, 34, 368; 137/341, 614.2

(56) References Cited

U.S. PATENT DOCUMENTS

| 2,285,913 | A | * | 6/1942 | Derrah .......................... 251/11 |
| 3,005,616 | A | * | 10/1961 | Seele ....................... 251/30.05 |
| 3,989,222 | A | * | 11/1976 | Yoshiyasu ................ 251/30.04 |
| 4,460,007 | A | * | 7/1984 | Pirkle .......................... 251/62 |
| 4,763,873 | A | * | 8/1988 | Phillips .................... 251/30.05 |
| 4,815,491 | A | * | 3/1989 | Prikle ......................... 251/149 |
| 4,816,083 | A | * | 3/1989 | Bangyan .................. 137/614.2 |
| 5,299,774 | A | * | 4/1994 | Arneson et al. ......... 251/30.02 |
| 5,551,664 | A | * | 9/1996 | Boke ....................... 251/30.03 |
| 5,915,410 | A | * | 6/1999 | Zajac ......................... 137/341 |

FOREIGN PATENT DOCUMENTS

| JP | 03-282154 | 12/1991 |
| JP | 05-240507 | 9/1993 |
| JP | 10-002445 | 1/1998 |
| JP | 10-184957 | 7/1998 |

* cited by examiner

*Primary Examiner*—John Bastianelli
(74) *Attorney, Agent, or Firm*—Dennison, Schultz & Dougherty

(57) ABSTRACT

A counter-flow prevention valve is disposed within a body of a pilot-type channel valve. While electrical power is applied to a solenoid coil and the pilot-type channel valve is opened, i.e., while a gas is flowing through the counter-flow prevention valve and the gas is expanding, heat generated by the application of electrical power to the solenoid coil is conducted via the body and is effectively transferred to the counter-flow prevention valve. Therefore, even if the gas contains water vapor and even if this gas is cooled due to significant expansion, the water vapor can be prevented from freezing within the counter-flow prevention valve. Moreover, the volume of the pipe between the pilot-type channel valve and the counter-flow prevention valve is small, thereby resulting in a fast rise in pressure within the pipe and a quick opening of the counter-flow prevention valve, which provides an excellent valve-opening response.

16 Claims, 3 Drawing Sheets

PILOT-TYPE CHANNEL VALVES PROVIDING COUNTER-FLOW PREVENTION

FIELD OF THE INVENTION

The present invention relates to techniques for preventing counter-flow in a pilot-type channel valve. More particularly, an objective of the present invention is to realize a pilot-type channel valve providing counter-flow prevention that can be driven with a small amount of power, that resists freezing, and that provides a superior valve-opening response.

DESCRIPTION OF THE RELATED ART

Pilot-type channel solenoid valves are well known and an example is described in Japanese Utility Model Laid-open Publication No. 59-83262. This art will be explained with reference to FIG. 1. In FIG. 1, reference number 1 indicates a body. An inlet 2 and an outlet 3 are formed on this body 1. Inlet 2 and outlet 3 are connected to each other via a passage 4. A valve seat 5 is formed on the top end face of passage 4. A cylindrical main valve 6 having a bottom is vertically movably disposed inside body 1. A ring-shaped protrusion 9 is integrally provided on the external bottom surface of main valve 6. Tube-shaped protrusion 9 can contact or separate from valve seat 5. A pilot chamber 7 is formed inside main valve 6. A pilot hole 8 is defined in the center of the bottom of main valve 6. A solenoid coil 10 is provided on the upper edge of body 1. A plunger 11 and a spring 13 are provided inside solenoid coil 10. A spherical pilot valve 12 is installed at the tip of plunger 11. When no electrical power is applied to solenoid coil 10, pilot valve 12 is biased by spring 13 and closes pilot hole 8. When electrical power is applied to solenoid coil 10, the magnetic force causes pilot valve 12 to separate from pilot hole 8. An extremely narrow gap 14 is provided between the external perimeter of main valve 6 and the internal perimeter of body 1.

According to this pilot-type channel solenoid valve, even when a large pressure difference exists between inlet 2 and outlet 3, main valve 6 can be opened by applying a small magnetic force to pilot valve 12. When a small magnetic force is applied to pilot valve 12, the high pressure within pilot chamber 7 is released through pilot hole 8, and therefore the high pressure, which is being applied to inlet 2, opens main valve 6. Even when a high pressure is being applied to inlet 2, the electromagnetic force required to open the valve can be small. When no electrical power is being applied to solenoid coil 10, the high pressure being applied to inlet 2 works in the direction of closing main valve 6; as a result, no electromagnetic force is needed to maintain the closed valve state. Therefore, a pilot-type channel solenoid valve, even when used in a pipe that is subject to a large pressure difference between inlet 2 and outlet 3, provides advantages in that solenoid coil 10, which is used for controlling the opening and closing of the channel, can be made compact and the valve can be driven with a small amount of electric power.

In an ordinary pipe, the direction of the fluid flow is predefined in that the fluid enters through inlet 2 and exits through outlet 3; therefore, no particular problems are encountered by a pilot-type channel valve. However, a pilot-type channel valve is characterized in that it has an inability to prevent counter-flow. If high pressure is applied from the side of outlet 3 against a closed pilot-type channel valve, the valve will easily open. Given that a pilot-type channel valve cannot prevent counter-flow, Japanese Utility Model Laid-open Publication No. 59-83262 proposed means for preventing the channel valve from generating abnormal noise during counter-flow.

A first means for preventing counter-flow in a channel valve is increasing the spring force that biases the movable valve toward the closed position. Therefore, in order to prevent counter-flow in a channel valve, it is necessary to use a channel valve that is closed by means of a large spring force and is opened using a large amount of power, instead of using a pilot-type channel valve. A second means is inserting a counter-flow prevention valve into the pipe and downstream from the pilot-type channel valve. Japanese Patent Laid-open Publication No. 10-2445 describes a technique of incorporating a counter-flow prevention valve inside a pipe that is connected to a channel valve, and this technique is intended to be applicable to pilot-type channel valves.

SUMMARY OF THE INVENTION

However, the first means, i.e., a channel valve that is closed by means of a large spring force and is opened by applying a large amount of power in order to open and close the channel while preventing counter-flow, requires a large amount of power for opening and closing the channel, thereby increasing the size of the channel valve. That is, the advantage of a pilot-type channel valve, which is the ability to be driven by a small amount of power, cannot be attained. The second means, i.e., a method of inserting a counter-flow prevention valve within the pipe downstream from a pilot-type channel valve, does not present the above-noted problem. However, this method still faces a problem in that the counter-flow prevention valve cannot recover from freezing once it becomes inoperable due to freezing. When the fluid that flows through the channel is a gas, the gas flows through the channel while being compressed or expanded, resulting in gas temperature fluctuations. If the pilot-type channel valve opens and the gas flows downstream while undergoing adiabatic expansion, the gas temperature will decrease; as a result, low-temperature gas will pass through the counter-flow prevention valve. If the gas contains water vapor, this water vapor may freeze within the counter-flow prevention valve. In this case, if a counter-flow phenomenon occurs after the pilot-type channel valve has closed, the counter-flow prevention valve, which is intended to prevent a counter-flow, becomes frozen in the open position and cannot prevent counter-flow. Also, it is not possible to heat the counter-flow prevention valve to prevent it from freezing when the gas, which has been cooled by undergoing adiabatic expansion, is passing through this counter-flow prevention valve; as a result, the valve tends to freeze. Moreover, the method of inserting a counter-flow prevention valve within the pipe downstream from a pilot-type channel valve also has a problem of poor valve-opening response. According to this method, opening the pilot-type channel valve increases the pressure within the pipe between the pilot-type channel valve and the counter-flow prevention valve, and the counter-flow prevention valve opens when this pressure reaches a predetermined value. In the method of inserting a counter-flow prevention valve in the downstream pipe, it takes time for the pressure to rise, because the capacity of the pipe between the pilot-type channel valve and the counter-flow prevention valve is large. The objective of the present invention is to create a valve that can prevent counter-flow, that can enjoy the advantage of a pilot-type channel valve, which is the ability to be driven by a small amount of power, that can prevent freezing of the counter-flow prevention valve, that can recover from freezing in the event that freezing occurs, and that also has an excellent valve-opening response.

In the pilot-type channel valve according to the present invention, a counter-flow prevention valve is disposed within the body of the pilot-type channel valve. When a counter-flow prevention valve is disposed within the body of the pilot-type channel valve, while electrical power is applied to the solenoid coil and the pilot-type channel valve is open, or while a high-pressure working fluid is introduced and the pilot-type channel valve is open, i.e., while a gas is flowing through the counter-flow prevention valve while undergoing adiabatic expansion, the heat generated by the application of the electrical power to the solenoid coil or the heat generated by the introduction of the working fluid is conducted through the body and is efficiently transferred to the counter-flow prevention valve. Therefore, even if the gas flowing in the channel contains water vapor and even when this gas cools due to significant expansion, the water vapor can be prevented from freezing within the counter-flow prevention valve. Moreover, even if freezing should occur for some reason, the heat from the solenoid coil or the heat generated by the adiabatic compression of the working fluid is conducted through the body and is efficiently transferred to the counter-flow prevention valve, thereby quickly thawing the frozen area. Furthermore, because the counter-flow prevention valve is disposed within the body of the pilot-type channel valve, the pipe volume between the pilot-type channel valve and the counter-flow prevention valve is small. Consequently, the pressure within the pipe rises quickly, thereby opening the counter-flow prevention valve without delay. Therefore, in order to provide a structure for opening and closing a channel while preventing counter-flow, the valve of the present invention can be used to achieve desirable characteristics, i.e., the counter-flow prevention valve is resistant to freezing and the valve itself has an excellent valve-opening response, particularly for a pipe that supplies hydrogen to fuel cells, which has been gaining much attention in recent years, while enjoying the advantage of a pilot-type channel valve, which is the ability to be driven by a small amount of power. A pilot-type channel valve providing counter-flow prevention according to the present invention is extremely useful for a hydrogen-supply pipe, because water vapor is mixed within such a pipe and because hydrogen passes through the pipe while undergoing volume changes. Note that in the case of the present invention, its advantages, i.e., the ability to be driven by a small amount of power, the resistance to freezing, and the excellent valve-opening response, can be enjoyed even if the counter-flow prevention valve is inserted on the upstream side of a pilot-type channel valve.

PREFERRED EMBODIMENTS

Figure 1:
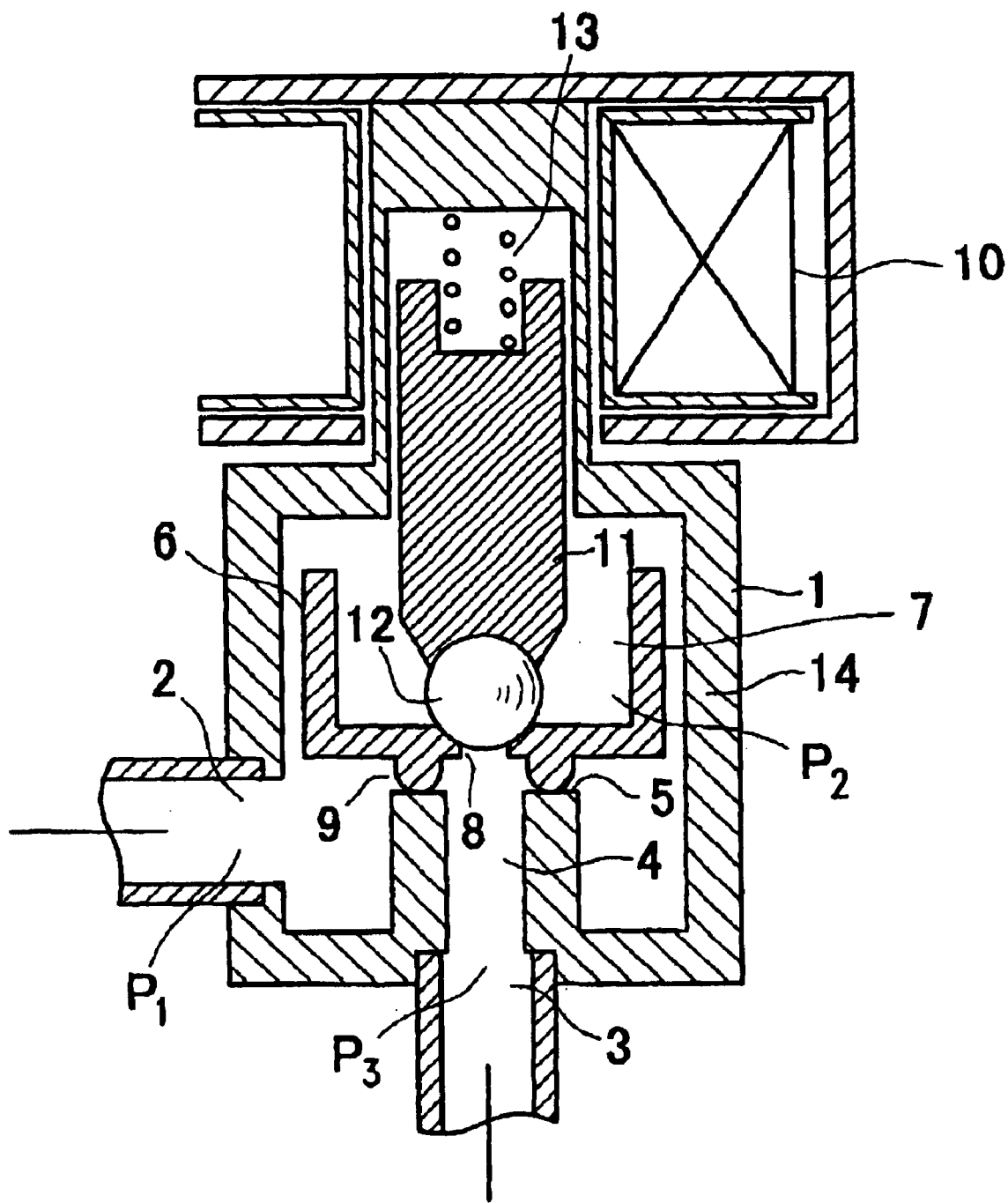
FIG. 1 shows a cross-sectional drawing of a conventional pilot-type channel valve.
Figure 2:
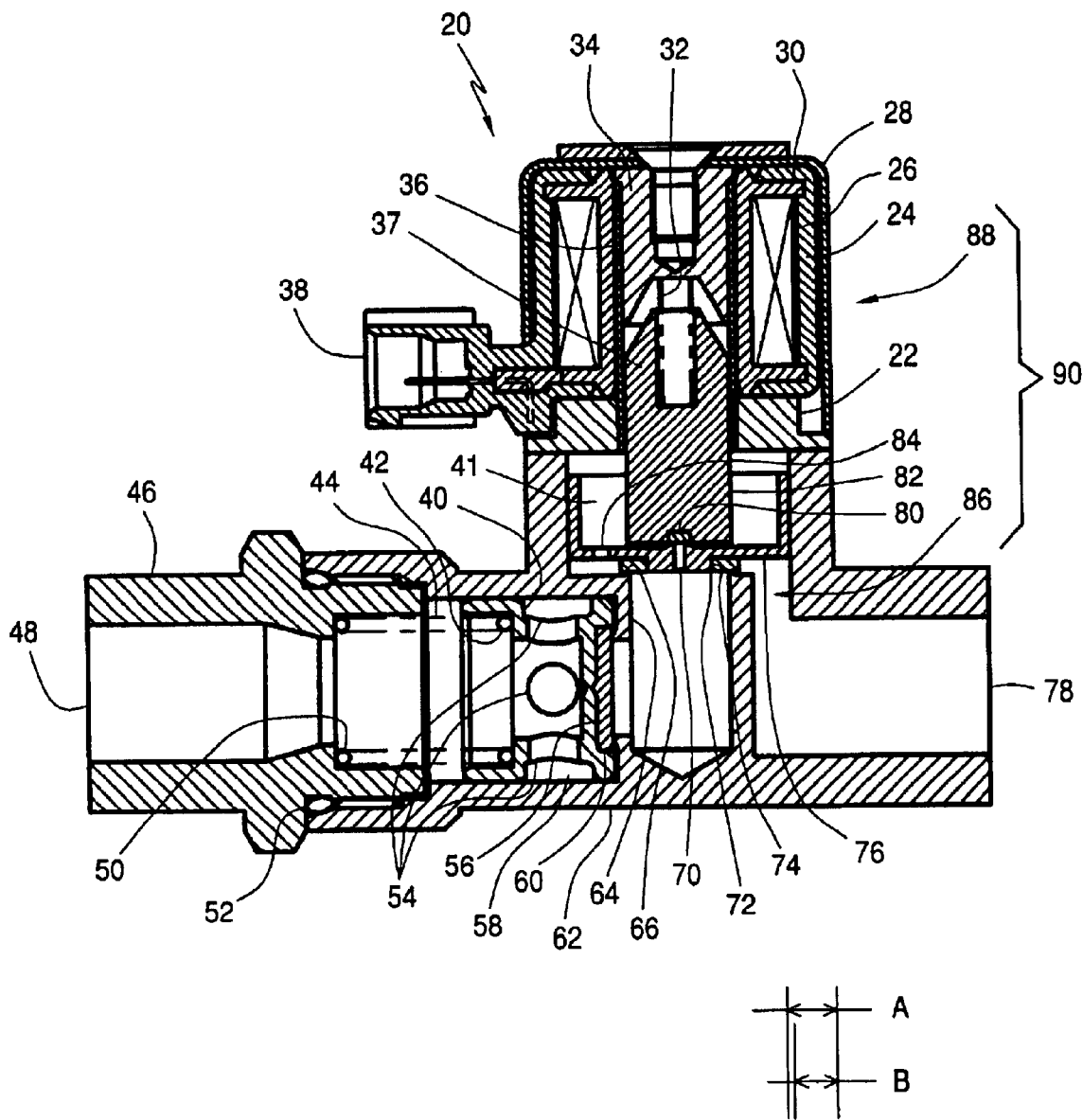
FIG. 2 shows a cross-sectional drawing of an embodiment of a pilot-type channel valve providing counter-flow prevention.

Preferred embodiments of the pilot-type channel valve providing counter-flow prevention according to the present invention are explained below. FIG. 2 shows a cross-sectional drawing of a pilot-type channel valve 20 providing counter-flow prevention. Pilot-type channel valve 20 providing counter-flow prevention is constructed by disposing a pilot-type channel valve 90 and a counter-flow prevention valve 40 within a body 62. Pilot-type channel valve 90 and counter-flow prevention valve 40 are connected in series and are disposed in close proximity to each other within body 62. Body 62 is formed from a material possessing a large thermal conductivity, such as aluminum.

Next, the structure will be explained in detail. Pilot-type channel valve 90 consists of a movable area 86 and an electromagnetic force generation area 88. Movable area 86 primarily consists of a main valve 76 and a pilot valve 82. Main valve 76 is cylindrical in shape and has a bottom, and has an outside diameter that allows it to slide vertically inside the space 41 provided inside body 62. A pilot hole 70 is provided in the center of the tip of main valve 76. A ring-shaped seal member 74, which is centered around pilot hole 70, is provided on the bottom tip surface of main valve 76. An orifice 84, which connects the inside and outside of the main valve 76, is provided on the tip of main valve 76. A ring-shaped valve seat 72, which is centered around pilot hole 70, is provided on the upper tip surface (internal surface) of main valve 76.

Pilot valve 82 is an approximately circular cylinder. A seal member 80, which contacts valve seat 72 of main valve 76, is provided at the tip of pilot valve 82. The rear end 37 of pilot valve 82 forms a plunger.

The structure of electromagnetic force generation area 88 will be explained. As clearly illustrated in FIG. 2, a cylindrical pipe 36 is inserted into the internal surface of a ring-shaped base 22 and the interior of a bobbin 30. Said pilot valve 82 (i.e., plunger 37) is slidably inserted into pipe 36. A stator 34 is also inserted into pipe 36. A spring 32 is disposed between stator 34 and pilot valve 82 (i.e., the concave area provided on plunger 37). A solenoid coil 26 is wound around the outer perimeter of the cylindrical area of bobbin 30. Solenoid coil 26 is sealed by bobbin 30 and a coil cover 24. Coil cover 24 has a connector area 38. A group of components, such as solenoid coil 26 comprising electromagnetic force generation area 88, are disposed within a case 28 and secured to base 22.

Base 22 of electromagnetic force generation area 88 is secured to body 62. In this secured state, said movable area 86 is positioned within space 41 inside body 62, which is connected to an inlet 78. Pilot hole 70 of main valve 76 faces the connecting route 64. Seal member 74 of main valve 76 can contact the valve seat 66 provided within body 62 (FIG. 2 shows valve seat 66 contacting seal member 74).

Body 62 has another opening area in addition to said inlet 78. Counter-flow prevention valve 40 is slidably inserted into this opening area. The location at which counter-flow prevention valve 40 is inserted is close to the location where solenoid coil 26 is wound. When electrical power is applied, heat is generated by solenoid coil 26 and the heat can be conducted via body 62 so as to reach counter-flow prevention valve 40. Counter-flow prevention valve 40 has an approximately cylindrical shape with a lid. The large-diameter areas located at both ends of counter-flow prevention valve 40 have external diameters that can horizontally slide along a space 58 defined within body 62. A gap, which is large enough to let fluid pass through, is provided between the large-diameter area on the tip side and the internal perimeter of body 62. A circular seal member 56 is provided in the center of the tip (lid) of counter-flow prevention valve 40. Seal member 56 can contact valve seat 60 provided within body 62 (FIG. 2 shows valve seat 60 contacting seal member 56). Multiple flow holes 54 for connecting the inside and outside of counter-flow prevention valve 40 are provided on the small-diameter area of counter-flow prevention valve 40. A stepped area 42 is provided within the boundary between the small-diameter area and the large-diameter area.

An approximately cylindrical stopper 46 is fitted into the tip of the aforementioned opening area of body 62. Body 62 and stopper 46 are sealed by a seal member 52. The other end of stopper 46, which end is not fitted into body 62, is open and forms outlet 48. A stepped area 50 is provided within stopper 46. A spring 44 is inserted between stepped area 50 of stopper 46 and said stepped area 42 of counter-flow prevention valve 40. This spring 44 biases counter-flow prevention valve 40 in the valve-closing direction (toward the right in FIG. 2). This spring 44 holds counter-flow prevention valve 40 (i.e., seal member 56) in contact with body 62 (i.e., valve seat 60) except when a fluid is flowing in through inlet 78. The force of spring 44 is small enough to allow the spring 44 to be instantly compressed when a fluid flows in through inlet 78.

The operation of pilot-type channel valve 20 providing counter-flow prevention in the present embodiment will now be explained. FIG. 2 shows a state in which both pilot valve 82 and main valve 76 are closed. Hereafter, this state will be simply referred to as the "closed valve state." In the closed valve state, pilot valve 82 is biased by the force of spring 32, thereby keeping seal member 80 in contact with valve seat 72. Consequently, main valve 76 is biased by this pilot valve 82, also keeping seal member 74 in contact with valve seat 66. When a fluid flows into body 62 through inlet 78, the pressure in the vicinity of the external end face of main valve 76 becomes high. At the same time, the fluid passes through orifice 84 and enters the space defined between pilot valve 82 and main valve 76, thereby causing the pressure within this space to also reach the same high pressure as the pressure in the vicinity of the external end face of main valve 76. Meanwhile, the pressure within channel 66 is low. At this time, the area in which high pressure is applied to push up main valve 76 (a range that is outside of seal member 74 and indicated by B in FIG. 2) is smaller than the area in which the high pressure is applied to push down main valve 76 (a range that is outside pilot valve 82 and indicated by A in FIG. 2); as a result, main valve 76 is ultimately pushed downward. As long as high pressure is being applied to the side of inlet 78, that pressure works in the direction of closing main valve 76. Therefore, seal member 74 of main valve 76 is biased against valve seat 66. When high pressure is being applied to the side of inlet 78, the pilot-type channel valve of the present embodiment maintains the closed valve state by means of this pressure in addition to the force of spring 32.

In order to open the valve from the state shown in FIG. 2, electrical power is applied to solenoid coil 26 so as to first open pilot valve 82 (valve-opening precursor state). Because the magnetic force of solenoid coil 26 is greater than the force of spring 32, pilot valve 82 is lifted, thereby separating seal member 80 from valve seat 72. Even if high pressure is being applied to inlet 78, that pressure is not being applied in the direction of closing pilot valve 82; therefore, pilot valve 82 can be opened using only a small magnetic force. The magnetic force of solenoid coil 26 can be much smaller than the magnetic force that is required to open main valve 76 against the applied pressure. The force of spring 32 is also smaller than this magnetic force. When pilot valve 82 is opened, the pressure within the space above main valve 76 decreases because the channel area of pilot hole 70 is greater than the channel area of orifice 84. Then, the pressure, which has been working in the direction of closing main valve 76, decreases. When the pressure that has been working from inside main valve 76 to bias main valve 76 in the valve-closing direction decreases, the force that is trying to push main valve 76 upward in FIG. 2 becomes dominant, thus moving main valve 76 upward and opening main valve 76.

While the valve is open, pilot valve 82 is biased upward in FIG. 2 due to the electromagnetic force of solenoid coil 26. In this state, a fluid can flow into connecting route 64 from inlet 78. Because the volume of connecting route 64 is small, the internal pressure increases within an extremely short period. When the pressure inside connecting route 64 increases, seal member 56 of counter-flow prevention valve 40 separates from valve seat 60 and the fluid flows from the right side of counter-flow prevention valve 40 to the left side. Counter-flow prevention valve 40 opens immediately after pilot-type channel valve 90 opens, resulting in an excellent valve-opening response.

As is clear from the above description, in pilot-type channel valve 20 providing counter-flow prevention of the present embodiment, said pilot-type channel valve 90 and counter-flow prevention valve 40 are connected in series and are disposed in close proximity to each other within body 62.

An explanation will be provided below as to how the fluid that has flowed in from inlet 78 passes through pilot-type channel valve 90 and counter-flow prevention valve 40 so as to flow out from outlet 46. When electrical power is applied to solenoid coil 26 and pilot-type channel valve 90 is opened, the fluid flows into connecting route 64 from inlet 78. Because the pressure within connecting route 64 becomes higher than the pressure at outlet 48, this pressure biases counter-flow prevention valve 40 in the valve-opening direction (to the left in FIG. 2). Then, spring 44 is instantly compressed and seal member 56 separates from valve seat 60. As a result, counter-flow prevention valve 40 becomes open. Said series of actions occur within an extremely short period because the volume of connecting route 64 is small, as was explained above. When counter-flow prevention valve 40 opens, the fluid can pass through the gap between the outer perimeter of the tip (lid) of counter-flow prevention valve 40 and body 62, can flow through flow hole 54 to pass through the inside of counter-flow prevention valve 40, and can then flow out through outlet 48. During this process, the heat generated from the application of electrical power to solenoid coil 26 is conducted via body 62 and is effectively transferred to counter-flow prevention valve 40. Therefore, even if the flowing fluid contains water vapor, and even if the fluid is cooled to an extremely low temperature due to significant expansion, the water vapor is prevented from freezing within counter-flow prevention valve 40.

If high pressure is applied to outlet 48 when the valve is closed, this pressure works in the direction of closing counter-flow prevention valve 40. At this time, counter-flow prevention valve 40 is not frozen. As a result, counter-flow prevention valve 40 reliably reaches the closed valve state. That is, seal member 56 contacts valve seat 60. Pilot-type channel valve 20 providing counter-flow prevention of the present embodiment can prevent counter-flow when high pressure is applied to outlet 48.

Pilot-type channel valve 20 having counter-flow prevention can prevent counter-flow while enjoying the advantages of pilot-type channel valve 90 in terms of opening and closing the channel, and can also prevent counter-flow prevention valve 40 from freezing. In the event that counter-flow prevention valve 40 becomes frozen for some reason, the heat generated by solenoid coil 26 can thaw the frozen area. Furthermore, the volume of connecting route 64 between pilot-type channel valve 90 and counter-flow prevention valve 40 is small, thereby resulting in an excellent valve-opening response.

In pilot-type channel valve 20 providing counter-flow prevention, pilot-type channel valve 90 and counter-flow prevention valve 40 are disposed in close proximity to each other within body 62. As a result, the heat generated by the application of electrical power to solenoid coil 26 is conducted via body 62 and is effectively transferred to counter-flow prevention valve 40, and the body of pilot-type channel valve 29 providing counter-flow prevention itself can also be made compact.

The large-diameter area on the tip of counter-flow prevention valve 40 has an outside diameter that allows it to slide within space 58, which is defined within body 62, while leaving a gap. When counter-flow prevention valve 40 becomes open, the fluid within connecting route 64 can flow into flow hole 54 by passing through the gap between the external perimeter of the tip (lid) of counter-flow prevention valve 40 and body 62. It is also acceptable to provide a hole at a position spaced from seal member 56 on the tip (lid) of counter-flow prevention valve 40, in order to cause the fluid within connecting route 64 to flow into the inside of counter-flow prevention valve 40. Moreover, the external perimeter of the tip (lid) of counter-flow prevention valve 40 may have an intermittently cut shape. Even with this hole or tip shape, counter-flow can be prevented when counter-flow prevention valve 40 is in the closed valve state, because seal member 56 is in contact with valve seat 60.

Figure 3:
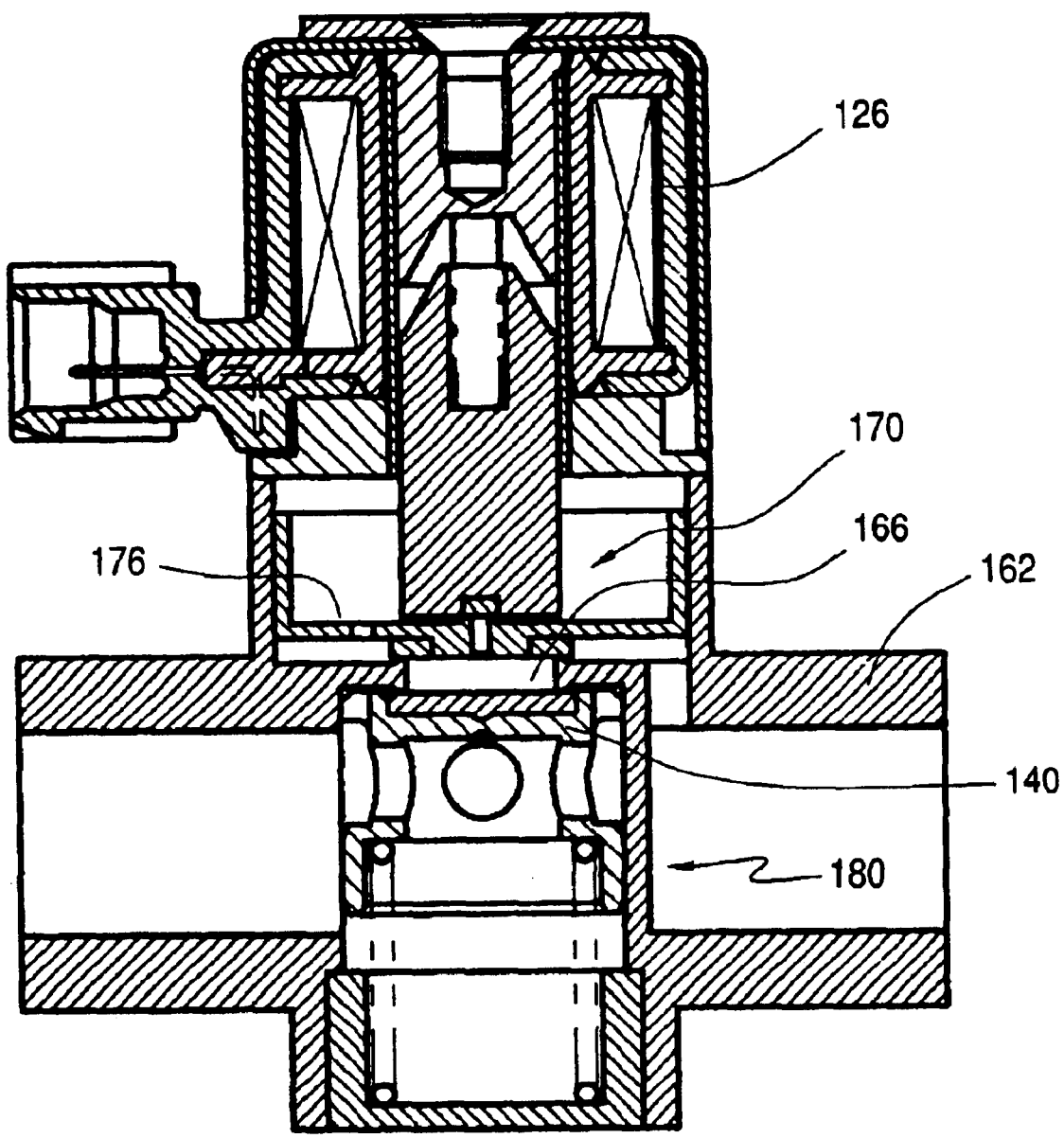
FIG. 3 shows a cross-sectional drawing of another embodiment of a pilot-type channel valve providing counter-flow prevention.

FIG. 3 shows another embodiment. In this case, the main valve 176 and the movable valve 140 of the counter-flow prevention valve 180 of pilot-type channel valve 170 are disposed on the same axis. That is, movable valve 140 is positioned directly below movable valve 176. In this case, the volume of connecting route 166 between pilot-type channel valve 170 and counter-flow prevention valve 180 is made as small as practicable, further improving the valve-opening response. Furthermore, the heat from solenoid coil 126 is more effectively conducted via body 162 to counter-flow prevention valve 140, thereby resulting in an enhanced anti-freezing property.

In the above-described embodiments, the pilot valve is opened by means of a solenoid coil. Alternatively, it is also possible to open the pilot valve by introducing a working fluid. In this case as well, because the introduction of the working fluid causes an adiabatic compression phenomenon, producing a heat-generation effect, the counter-flow prevention valve can be prevented from freezing and its thawing can be promoted by disposing a counter-flow prevention valve within the body of the pilot-type channel valve.

What is claimed is:

1. An apparatus comprising:
   means for defining a channel for a flow of fluid, the channel defining means being thermally-conductive and also defining an inlet and an outlet for the channel,
   first means for permitting fluid flow through the channel in a direction from the inlet to the outlet, the first means being disposed within the channel, the first means further comprising means for generating heat, and
   second means for preventing fluid flow through the channel in a direction from the outlet to the inlet, wherein the second means is disposed proximally to the first means within the channel such that heat generated by the heat generating means is reliably conducted via the channel defining means to the second means in order to prevent the second means from freezing.

2. An apparatus as in claim 1, wherein the first means and second means are disposed in a manner so as to minimize space within the channel between the first means and second means.

3. An apparatus as in claim 2, wherein the first means and second means are arranged and constructed to control a flow of a gas containing water vapor.

4. An apparatus comprising:
   a thermally-conductive pipe body defining a hollow interior,
   a first valve disposed within the hollow interior and comprising:
      a first valve seat fixedly disposed within the hollow interior and having a hole defined therein,
      a first movable valve slidably disposed within the hollow interior and having a pilot hole defined therein, a first seal disposed on a first side of the first movable valve and surrounding the pilot hole, and a second valve seat disposed on a second side of the first movable valve and surrounding the pilot hole,
      a movable pilot valve having a second seal arranged and constructed to contact the second valve seat and close the pilot hole,
      a first spring biasing the movable pilot valve towards the first movable valve and the first valve seat, and
      a solenoid arranged and constructed to bias the movable pilot valve away from the first movable valve when energized, and
   a second valve disposed within the hollow interior proximally to the first valve, such that heat generated by energizing the solenoid is conducted via the thermally-conductive pipe body to the second valve, the second valve comprising:
      a second movable valve slidably disposed within the hollow interior and having a third valve seat,
      a third seal fixedly disposed within the hollow interior and having a hole defined therein, the third seal being arranged and constructed to stop a flow of fluid through the pipe body when the third valve seat contacts the third seal, and
      a second spring biasing the second movable valve towards the third seal,
   wherein the first valve has a first valve opening direction, the second valve has a second valve opening direction, and the first valve opening direction is opposite of the second valve opening direction with respect to the direction of fluid flow through the pipe body.

5. An apparatus as in claim 4, wherein the second valve prevents a flow of fluid in a direction opposite of the first valve opening direction.

6. An apparatus as in claim 4, further comprising a stopper fixedly disposed within the hollow interior, wherein the second spring is disposed between the stopper and the second movable valve.

7. An apparatus as in claim 6, further comprising a fourth seal disposed between the stopper and the hollow interior.

8. An apparatus as in claim 4, further comprising a second pipe coupled to the pipe body, a stator fixedly disposed within the second pipe, and a bobbin disposed around the stator, wherein the first spring is disposed between the stator and the movable pilot valve and the solenoid is wrapped around the bobbin.

9. An apparatus as in claim 4, wherein the pipe body further defines an inlet and an outlet, wherein the second valve is arranged and constructed to prevent the fluid from flowing from the outlet to the inlet.

10. An apparatus as in claim 9, wherein the second spring rapidly compresses to open the hole within the third seal when the fluid pressure on the side of the inlet is greater than the fluid pressure on the side of the outlet, thereby permitting fluid flow from the inlet to the outlet.

11. An apparatus as in claim 10, wherein the second valve is arranged and constructed to reliably seal the hole defined within the third seal when the fluid pressure on the side of the outlet is greater than the fluid pressure on the side of the inlet, thereby reliably preventing counter-flow from the outlet to the inlet.

12. An apparatus as in claim 4, 3wherein a gap is defined between the second movable valve and the hollow interior of the pipe body, the gap being sufficiently large to permit fluid to pass therethrough, the second movable valve having at least one flow hole communicating with the gap, the at least one flow hole being provided substantially perpendicular to the hole defined within the third seal.

13. An apparatus as in claim 4, wherein the first valve opening direction is disposed substantially perpendicular to the second valve opening direction.

14. An apparatus as claim 4, wherein the first valve opening direction is disposed substantially in parallel with the second valve opening direction.

15. An apparatus as in claim 4, further comprising:
- a stopper fixedly disposed within the hollow interior, wherein the second spring is disposed between the stopper and the second movable valve,
- a fourth seal disposed between the stopper and the hollow interior,
- a second pipe coupled to the pipe body,
- a stator fixedly disposed within the second pipe,
- a bobbin disposed around the stator, wherein the first spring is disposed between the stator and the movable pilot valve and the solenoid is wrapped around the bobbin, and
- a gap defined between the second movable valve and the hollow interior of the pipe body, the gap being sufficiently large to permit fluid to pass therethrough, the second movable valve having at least one flow hole communicating with the gap, the at least one flow hole being provided substantially perpendicular to the hole defined within the third seal, wherein the pipe body further defines an inlet and an outlet, the second valve is arranged and constructed to prevent fluid from flowing in the direction from the outlet to the inlet, the second spring rapidly compresses to open the hole within the third seal when fluid pressure on the side of the inlet is greater than fluid pressure on the side of the outlet, thereby permitting fluid flow in the direction from the inlet to the outlet, the second valve is further arranged and constructed to reliably seal the hole defined within the third seal when the fluid pressure on the side of the outlet is greater than the fluid pressure on the side of the inlet, thereby reliably preventing counter-flow in the direction from the outlet to the inlet.

16. An apparatus as in claim 15, wherein the pipe body comprises aluminum and the apparatus is further arranged and constructed to control a flow of gas.

* * * * *